March 5, 1968 W. W. PULTZ 3,371,995
METHOD OF MAKING MACROSCOPIC SILICON CARBIDE
FIBERS WITH A SILICA SHEATH
Filed July 9, 1965
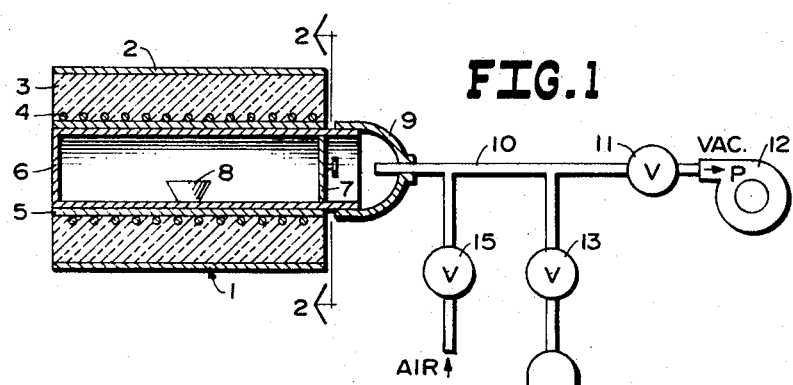
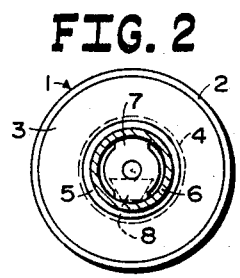
INVENTOR.
Wallace W. Pultz
BY
ATTORNEY

United States Patent Office 3,371,995
Patented Mar. 5, 1968

3,371,995
METHOD OF MAKING MACROSCOPIC SILICON
CARBIDE FIBERS WITH A SILICA SHEATH
Wallace W. Pultz, Corning, N.Y., assignor to Corning
Glass Works, Corning, N.Y., a corporation of New
York
Filed July 9, 1965, Ser. No. 470,729
9 Claims. (Cl. 23—208)

This invention relates to the production of macroscopic fibers containing crystals of beta-silicon carbide.

The remarkable increase in mechanical strength which can be imparted to plastics, cements, and metals through the addition of very minor amounts of ceramic fibers thereinto has fostered considerable research into methods for manufacturing such fibers. The high strength of SiC even at very elevated temperatures and its relative inertness to chemical reagents make such fibers particularly useful for reinforcing elements in high temperature applications or where resistance to corrosive liquids is desired.

Therefore, the primary object of this invention is to provide a method for producing macroscopic fibers containing crystals of beta-silicon carbide which utilizes relatively inexpensive starting materials, which can be practiced with a quite uncomplicated apparatus, and which is relatively simple in operation.

Another object of this invention is to provide a method for producing macroscopic fibers containing beta-silicon carbide crystals which are of relatively uniform dimensions such as to be particularly suitable as reinforcing elements in plastics, rubbers, ceramics, and metals.

A still further object of this invention is to provide a method for producing macroscopic fibers containing beta-silicon carbide crystals wherein the conditions of operation are such that substantially all of the starting materials are utilized to form fibers thus resulting in a highly efficient operation.

Yet another object of this invention is to provide a method for producing macroscopic fibers containing beta-silicon carbide crystals which, with the proper apparatus, can be utilized to produce fibers by a continuous process.

Other objects of this invention will become apparent from a study of the following description and an examination of the appended drawings wherein:

FIGURE 1 is a diagrammatic arrangement of apparatus suitable for producing fibers according to the present invention utilizing a single batch technique; and FIGURE 2 is a vertical sectional view along lines 2—2 of FIGURE 1.

I have discovered that the objects of this invention can be attained through the reaction of carbon with silica in the presence of an atmosphere of at least one halide gas selected from the group consisting of HF, HCl, HBr, and SiCl$_4$. Defining the invention in basic terms, this new method of manufacturing macroscopic fibers containing silicon carbide crystals comprises exposing a charge composed of measured amounts of silica and carbon to a temperature range wherein reaction between the silica and carbon will occur and maintaining this temperature for a period of time sufficient to assure the development of the desired fibers, this reaction occurring in a gaseous environment consisting of controlled partial pressures of hydrogen fluoride, hydrogen chloride, hydrogen bromide, silicon chloride or mixtures thereof. Fibers having a fairly uniform diameter of 1–2 microns with lengths up to and greater than 50 mm. can be produced.

The mechanism by which the silicon carbide fibers are formed by this method of this invention is not fully known. Hence, the basic reaction between carbon and silica to produce fibers has been postulated to consist of two steps, viz.:

(1) $\quad C + SiO_2 \rightarrow SiO + CO$ 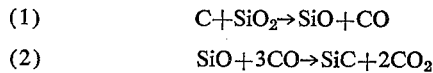

(2) $\quad SiO + 3CO \rightarrow SiC + 2CO_2$

Thus, there is believed to be a transport of gaseous SiO and CO from the heated charge, this combination of gases condensing to a fibrous deposit of SiC at a temperature somewhat below that required to cause reaction between the silica and carbon. The function of the halide gases has been theorized both as a carrier gas and as, perhaps, reacting with the silica or carbon to yield some sort of an intermediate product which is converted to SiC, e.g.:

(3) $SiO_2 + xHCl + 2C \rightarrow SiCl_x + 2CO$
$\qquad\qquad\qquad + x/2 H_2 \rightarrow$ fibrous product 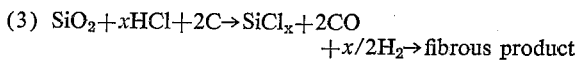

where $x$ can range from 1 to 4

However, analyses of the fiber deposit have not shown the presence of any such intermediate halide product. Atmospheres containing the halogen gases fluorine, chlorine, or bromine alone or in combination with the halide gases demonstrate a marked reduction in fiber yield. Since the speed of fiber growth utilizing the gaseous atmospheres of the present invention is much greater than where an inert gas is employed as the carrier gas or transporting agent for the SiO and CO, it is believed that the halide atmospheres enter into the reaction, at least to some extent.

Explaining the process in more specific detail, my invention comprises the blending together of a charge of carbon and silica in a molar ratio of about 1:1 to 5:1, preferably 2:1 to 3:1, transferring this mixture to a furnace, and then exposing the charge to a temperature range of about 1300°–1550° C. while an atmosphere of at least one of the above-described halides is introduced for a period of time sufficient to obtain the desired fiber formation, the partial pressure of the gaseous halides being controlled within about 25–350 mm. of mercury. Fiber growth begins substantially immediately when the charge is treated at the reaction temperature and an apparatus could be designed wherein an amount of batch charge could be continuously added to the reaction chamber to match the amount of fibers removed from the chamber as the reaction is going forward. With such an apparatus, a continuous process for growing these fibers could be had. In general, however, where an individual batch method is used, a reaction time of at least about one-half hour has been found necessary to produce a satisfactory deposit of fibers. The rate of reaction is temperature-dependent so the time required to insure a good yield of fibers is necessarily influenced by the reaction temperature utilized. In view of this interdependence of time and temperature upon the growth of fibers, a reaction time of about 1 to 3 hours has been preferred in commercial practice although much longer periods of reaction time, i.e., 24 hours and longer, can be utilized with no adverse effect upon the quality of the fibers. However, since the yield of fibers is not increased to any substantial extent by such long reaction periods, such practice is not deemed economically feasible.

When carbon is present in the batch in an amount less than the molar ratio of carbon to silica of 1:1, a substantial residue of unreacted silica will remain after fiber growth is complete. Contrariwise, although molar ratios of carbon to silica greater than about 5:1 can be reacted successfully to produce satisfactory growths of fibers, it is not economical to utilize such since large residues of unreacted carbon result and deposits of particulate SiC are often built up in the reaction area. Hence, a charge containing carbon and silica in a molar ratio of about 2:1 to 3:1 has been found to be optimum for speed and completion of reaction.

As has been discussed above, the rate of fiber growth is temperature-dependent. Since the rate of fiber growth is so slow and the total yields thereof so much less, reaction temperatures below about 1300° C. are not deemed commercially practical. On the other hand, the production of fibers which are essentially uniform in diameter becomes extremely difficult at reaction temperatures much above 1550° C. and the fiber deposit tends to become compacted thus interfering with the separation and dispersion of the fibers.

I have found that the substantial elimination of oxygen and nitrogen from the reaction system is to be preferred since oxygen acts to oxidize the carbon in the charge and nitrogen appears to have a deleterious effect upon the reaction, substantially repressing the growth of fibers. Therefore, although a desirable yield of fibers can be obtained in a dynamic reaction system wherein a flow of the halide gas is passed over the charge as it is being heated to the reaction temperature such that the residual air in the chamber is flushed out before the reaction begins, it is more economical and efficient (and, in a static system, necessary) to draw a vacuum of less than 1 mm. of mercury before or during the heating to reaction temperature.

Since the rate of development of fibers is dependent upon temperature, it must obviously follow that the rate of transport of gaseous products from the charge proceeds more rapidly as the reaction temperature is increased. The partial pressure of the added halide gases should not total much more than about 350 mm. of mercury since a definite repressing effect is observed upon the quantity of fibers grown.

As has been explained above, it is believed that gaseous SiO and CO are first produced through the reaction of silica with carbon along with any gaseous intermediate halide compounds which may result from an interaction between the added gaseous halides and the batch materials. These gases are then transported away from the starting materials to a cooler area of the reaction chamber where the desired fibers are deposited. The required reaction between the gaseous products to produce macroscopic fibers containing crystals of SiC takes place in the range of 1075°–1400° C., the principal portion of the deposit commonly occurring between 1100° C. and 1300° C.

I have found that whereas the most abundant growths of fibers are obtained where extremely pure batch materials and added halide gases are utilized, very satisfactory yields of fibers have been grown where relatively crude batch materials such as sand and charcoal have been used. Similarly, halide gases of the highest purity need not be employed as long as the amounts of free oxygen and nitrogen are held low and, preferably, are absent.

The fibers range in color from pale yellow to light green. The HF grown fibers are generally longer than those deposited in the other atmospheres, with many individual fibers exceeding 50 mm. in length. However, microscopic studies demonstrated that the diameters of the fibers appear to be generally the same, about 1–2 microns, no matter which atmosphere is utilized. Hence, a maximum length to diameter ratio of about 50,000:1 is found in these fibers. Electron micrographs and X-ray diffraction patterns along with chemical analyses and optical microscopy have identified these fibers as consisting of a core of beta-silicon carbide crystals with a surface sheath of silica.

The surface layer of $SiO_2$ on these fibers is of great practical significance in the utilization of them in various applications. This sheath enables the fibers to be readily wetted by both in polar and non-polar liquids. This feature renders the fibers available for reinforcing a wide variety of organic and inorganic products. Also, this $SiO_2$ surface layer appears to result in developing a stronger bond between the fibers and the material to be reinforced, particularly with concretes and plastics, thus enabling the intrinsic strength of the fibers to be more completely utilized.

One apparatus suitable for practicing the invention is illustrated in the accompanying drawings. Hence, there is shown a furnace consisting of a refractory tube wound with wire in such a manner that a temperature gradient is maintained along the length of the tube comprising the reaction chamber, the rear end of the tube being the hot end. A refractory ceramic container or "boat" holding the batch charge is positioned within the refractory tube in the area where the necessary temperature for reaction can be attained. The furnace is then evacuated to a pressure of less than 1 mm. of mercury, this vacuum being maintained as the temperature is raised within the tube to permit essentially complete outgassing. When a temperature of about 1170° C. is reached in the area of the reaction boat, the halide gases are introduced into the reaction chamber to the desired partial pressures and the temperature raised rapidly until the reaction boat is at a predetermined temperature within the range 1300°–1550° C. The reaction boat is maintained at this temperature for a period of time necessary to deposit a good yield of fibers and the furnace then cooled to room temperature.

Now, describing this apparatus in terms of the appended drawings, there is shown a gradient furnace, depicted generally in side elevation in cross section at 1, consisting of an alumina, mullite, of sillimanite refractory tube 5 wound with platinum or platinum-rhodium alloy wire 4 surrounded with insulation 3, the composite unit being enclosed and held in place by a steel casing 2. The windings of the wire are spaced at predetermined distances such that a temperature gradient is set up within the refractory tube 5, the hottest area of the tube being at the rear thereof. A inner or working liner 6 consisting of a mullite or sillimanite refractory tube closed at one end is inserted to protect the wire-wound tube 5 from mechanical injury and corrosion during operation of the furnace and, thereby, to preclude a furnace failure which could result from the reaction products contacting the wire. The working liner 6 extends a short distance in front of the furnace where it is connected to a pipe 10 through a glass connection 9. Pipe 10 leads to a vacuum pump 12 through valve 11 or to a source of air (not shown) through valve 15 or to a source of halide gas, as exemplified by lecture bottle 14 through valve 13. A fairly close-fitting platinum disc 7 is utilized as a radiation shield to reduce the escape of heat out of the mouth of the working liner 6 but which permits a vacuum to be drawn within the furnace and the halide atmosphere to be introduced therein. An alumina refractory boat 8 containing the batch charge of carbon and silica is placed within the working liner 6 at that position where the predetermined desired temperature can be obtained.

In the following examples, boat 8 was filled with a charge of charcoal and acid-washed pulverized sand in the molar ratio of about 3:1 and positioned within the working liner 6 at the proper place to obtain the desired reaction temperature. The radiation shield 7 was then inserted into position. Pipe 10 was then connected to the working lining 5 through the glass connection 9. The furnace was then heated up to produce a temperature of about 1170° C. in the area of the refractory boat 8 during which time a vacuum of about 1 mm. of mercury was drawn and maintained through vacuum pump 12. Thereafter valve 11 was closed and valve 13 opened to permit the desired halide gas from lecture bottle 14 to pass into the working liner 6 to a predetermined pressure and then valve 13 is closed. The area of the reaction boat was then heated to the desired temperature and held thereat for a predetermined length of time to observe the development of fibers. Finally, the heat to the furnace was cut off and the furnace allowed to cool to about 400° C. at which time valve 15 was opened to introduce air to bring the reaction chamber to atmospheric pressure while cooling it to room temperature. Refractory boat 8 was removed from the furnace and the deposit of fibers examined.

Table I records the effect of the added halide gases upon fiber yield. Example 7 reveals the need for the added halide gases. The same apparatus and batch charge were utilized as in Examples 1–6 but a vacuum of about 5 microns of mercury was drawn and maintained throughout the run. Each description of fiber growth represents an attempt to rank the fibers by visual observation within the arbitrary series 1 to 10, wherein 10 signified the most desirable product.

Table I

| Ex. No. | Initial Pressure (mm.) | | | | Temperature of Reaction, ° C. | Time, hrs. | Description |
| --- | --- | --- | --- | --- | --- | --- | --- |
| | HF | HCl | SiCl₄ | HBr | | | |
| 1 | 100 | | | | 1,410 | 3 | 10 |
| 2 | | 100 | | | 1,410 | 3 | 7 |
| 3 | | | 100 | | 1,410 | 3 | 6 |
| 4 | | | | 100 | 1,410 | 3 | 6 |
| 5 | | | | 120 | 1,410 | 3 | 3 |
| 6 | | | | 350 | 1,410 | 3 | 5 |
| 7 | Vacuum | | | | 1,410 | 3 | None |

This table amply demonstrates the need for a carrier gas and illustrates the effectiveness of the indicated halide gases in providing for the transport of the gaseous reactants. Example 4 clearly illustrates the dramatic decrease in fiber yield when the partial pressure of halide gas is insufficient and Example 6 demonstrates the somewhat repressive effect a too high partial pressure has upon the reaction.

Table II sets forth the effect of variations in reaction temperatures, in reaction times, and in the partial pressure of the halide gas upon the yield of fibers, as observed by utilizing the same apparatus and batch charge as described above. The refractory ceramic tubes employed as reaction chambers for this invention are subject to deformation and actual collapse where a high vacuum is drawn therein at temperatures higher than about 1450° C. Therefore, to offset this limitation in the mechanical strength at high temperatures of the refactory tubes utilized, hydrogen gas was added to yield a combined partial pressure of at least 200 mm. of mercury. However, this addition appears to diminish the yield of fibers slightly and a hydrogen atmosphere alone will not result in the macroscopic fibers producer by the halide atmospheres. The addition of the halogen gases, fluorine, chlorine, or bromine, to the gaseous halides appears to repress the fiber growth. This apparent poisoning action which the addition of halogen gases has upon fiber growth is not understood but is assumed to be the result of an adverse effect upon the reaction chemistry. In any event, partial pressures of the halide gases alone or in combination with hydrogen much greater than 350 mm. exert an undesirable excessively repressive action upon the growth of fibers.

Table II

| Ex. No. | Initial Pressure (mm.) | | | | Temperature of Reaction, ° C. | Time, hrs. | Description |
| --- | --- | --- | --- | --- | --- | --- | --- |
| | HF | HCl | SiCl₄ | HBr | | | |
| 8 | 25 | | | | 1,350 | 5 | 10 |
| 9 | 25 | | | | 1,410 | 3 | 10 |
| 10 | 25 | | | | 1,440 | 2 | 10 |
| 11 | 25 | | | | 1,485 | 1 | 10 |
| 12 | 25 | | | | 1,525 | ½ | 10 |
| 13 | 250 | | | | 1,350 | 5 | 10 |
| 14 | 250 | | | | 1,410 | 3 | 10 |
| 15 | 250 | | | | 1,440 | 2 | 10 |
| 16 | 250 | | | | 1,485 | 1 | 10 |
| 17 | 250 | | | | 1,525 | ½ | 10 |
| 18 | | 25 | | | 1,350 | 15 | 10 |
| 19 | | 25 | | | 1,410 | 9 | 10 |
| 20 | | 25 | | | 1,440 | 5 | 10 |
| 21 | | 25 | | | 1,485 | 3 | 10 |
| 22 | | 25 | | | 1,525 | 2 | 10 |
| 23 | | 250 | | | 1,350 | 15 | 10 |
| 24 | | 250 | | | 1,410 | 9 | 10 |
| 25 | | 250 | | | 1,440 | 5 | 10 |
| 26 | | 250 | | | 1,485 | 3 | 10 |
| 27 | | 250 | | | 1,525 | 2 | 10 |
| 28 | | | 25 | | 1,410 | 12 | 10 |
| 29 | | | 25 | | 1,440 | 9 | 10 |
| 30 | | | 25 | | 1,485 | 4 | 10 |
| 31 | | | 250 | | 1,410 | 12 | 10 |
| 32 | | | 250 | | 1,440 | 9 | 10 |
| 33 | | | 250 | | 1,485 | 4 | 10 |
| 34 | | | | 25 | 1,410 | 14 | 10 |
| 35 | | | | 25 | 1,440 | 12 | 10 |
| 36 | | | | 25 | 1,485 | 6 | 10 |
| 37 | | | | 250 | 1,410 | 14 | 10 |
| 38 | | | | 250 | 1,440 | 12 | 10 |
| 39 | | | | 250 | 1,485 | 6 | 10 |

This table delineates the various process parameters of the invention. Thus, the direct relationship existing between the temperature utilized to effect the reaction and the growth of fibers is clearly drawn as is the apparent total lack of relationship between the reaction temperature utilized and the partial pressure of the halide gas. Hence, the period of reaction time necessary to produce the optimum growth of fibers is much longer at 1350° C. than at 1485° C. And, surprisingly, although the formation of gaseous products is quite slow at the lower end of the effective temperature range, increased partial pressures of the halide gas seem to exert no significant repressing effect until pressures over 350 mm. of mercury are utilized. Thus, partial pressures of the halide gases ranging between 25 mm. and 250 mm. appear to function equally well. However, due to the fact that the rate of reaction is more rapid at higher temperatures, a partial pressure of halide gas of about 250 mm. of mercury is preferred since no inert diluent gas such as hydrogen needs to be added to preclude breakage of the refractory tube. The actual repressive effect upon the reaction caused by the added hydrogen gas is not very considerable but the hazards inherent in working with it discourage such use. Finally, it can be observed that the molecular weight of the halide gas influences the rate of reaction, the lower molecular weight gases acting to speed the transport of gaseous products.

The preferred embodiment of the invention contemplates a batch charge of carbon and silica in the ratio of 2:1 to 3:1 which is subjected to a temperature of about 1485° C. in an atmosphere of HF at a partial pressure of about 250 mm. of mercury. Although the rate of reaction is seen to be faster at 1525° C., the geometry of the fibers is somewhat less uniform.

As noted above, an inert gas such as hydrogen may be added to the reaction chamber as a carrier or diluent gas with little apparent harmful effect. The addition of a diluent gas such as hydrogen is practically advantageous in that a total pressure of one atmosphere may be utilized within the reaction system. The ability to practice the invention at a pressure of one atmosphere is useful not only in the static system described in detail above and illustrated in the appended drawings but also in a dynamic, gas-flowing system. However, the addition of a diluent gas at high partial pressures does exert a repressing effect upon the fiber growth so this practice is preferably followed only at the higher reaction temperatures.

It will be appreciated that modifications in the illustrated design of the reaction apparatus and in the detailed procedural steps of operation may be made without departing from the scope of the invention so long as the specified combination of temperatures, times, batch charges, and ambient atmospheres is observed. Likewise, although no specific example of such has been set forth in the tables, it will be understood that mixtures of the described halide gases may be utilized as the ambient atmosphere instead of a single gas. Finally, it will be appreciated that although the invention has been described in terms of a static process, the required interrelation of temperatures, times, batch charges, and ambient atmospheres can be met in a dynamic system through apparatus design. In any event, the selection of these parameters can be readily defined by one skilled in the art within the framework of the basic description set forth above.

I claim:

1. A method for manufacturing macroscopic fibers containing beta-silicon carbide crystals with a surface sheath of silica comprising the steps of providing a mixture of carbon and silica in a molar ratio ranging between about 1:1 to 5:1 in a reaction chamber, contacting said mixture at a temperature ranging about 1300°–1550° C. with an atmosphere containing at least one halide gas selected from the group consisting of hydrogen fluoride, hydrogen chloride, hydrogen bromide, and silicon tetrachloride, the halide gas having a partial pressure ranging about 25–350 mm. of mercury, maintaining said temperature and atmosphere for a period of time sufficient to attain the desired fiber formation after which the fibers are cooled to room temperature.

2. A method of manufacturing macroscopic fibers according to claim 1 wherein the atmosphere consists of a mixture of halide gas and hydrogen.

3. A method of manufacturing macroscopic fibers according to claim 1 wherein the period of time sufficient to attain the desired fiber formation ranges about ½–24 hours.

4. A method for manufacturing macroscopic fibers containing beta-silicon carbide crystals with a surface sheath of silica comprising the steps of providing a mixture of carbon and silica in a molar ratio ranging about 1:1 to 5:1 in a reaction chamber, evacuating said chamber to an absolute pressure of not more than about 1 mm. of mercury, thereafter contacting said mixture at a temperature ranging about 1300°–1550° C. with an atmosphere containing at least one halide gas selected from the group consisting of hydrogen fluoride, hydrogen chloride, hydrogen bromide, and silicon tetrachloride, the halide gas having a partial pressure ranging about 25–350 mm. of mercury, maintaining said temperature and atmosphere for a period of time sufficient to attain the desired fiber formation after which the fibers are cooled to room temperature.

5. A method for manufacturing macroscopic fibers according to claim 4 wherein the atmosphere consists of a mixture of halide gas and hydrogen.

6. A method for manufacturing macroscopic fibers according to claim 5 wherein the sum of the partial pressures of the halide gas and hydrogen totals about one atmosphere pressure.

7. A method for manufacturing macroscopic fibers according to claim 4 wherein the period of time sufficient to attain the desired fiber formation ranges about ½–24 hours.

8. A method for manufacturing macroscopic fibers according to claim 4 wherein the reaction chamber is heated to about 1485° C.

9. A method for manufacturing macroscopic fibers according to claim 8 wherein the time for maintaining the reaction temperature is about one hour.

References Cited

UNITED STATES PATENTS

| | | | |
|---|---|---|---|
| 3,161,473 | 12/1964 | Pultz | 23—208 |
| 3,335,049 | 8/1967 | Pultz | 106—44 X |

OSCAR R. VERTIZ, *Primary Examiner.*

G. T. OZAKI, *Assistant Examiner.*